(12) United States Patent
Kongo

(10) Patent No.: US 9,938,650 B2
(45) Date of Patent: Apr. 10, 2018

(54) EMBROIDERY DESIGN CONNECTING DATA GENERATING APPARATUS, EMBROIDERY DESIGN CONNECTING DATA GENERATING METHOD, RECORDING MEDIUM FOR STORING PROGRAM, AND SEWING SYSTEM

(71) Applicant: Janome Sewing Machine Co., Ltd., Tokyo (JP)

(72) Inventor: Takeshi Kongo, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 15/431,973

(22) Filed: Feb. 14, 2017

(65) Prior Publication Data

US 2017/0316580 A1    Nov. 2, 2017

(30) Foreign Application Priority Data

Apr. 28, 2016    (JP) .................................. 2016-091972

(51) Int. Cl.
*D05B 19/02*    (2006.01)
*G06T 7/73*    (2017.01)
(Continued)

(52) U.S. Cl.
CPC .......... *D05B 19/02* (2013.01); *G06K 9/2063* (2013.01); *G06K 9/2081* (2013.01); *G06T 7/74* (2017.01);
(Continued)

(58) Field of Classification Search
CPC .......... D05B 9/08; D05B 19/10; D05B 19/12; D05B 19/16; D05B 19/02; D05C 5/02
(Continued)

(56) References Cited

U.S. PATENT DOCUMENTS 4,998,489 A * 3/1991 Hisatake ................ D05B 19/08
112/103
5,323,722 A * 6/1994 Goto ................... G05B 19/4205
112/102.5
(Continued)

FOREIGN PATENT DOCUMENTS

JP    5687746 B2    3/2015

*Primary Examiner* — Danny Worrell
(74) *Attorney, Agent, or Firm* — Nakanishi IP Associates, LLC

(57) ABSTRACT

When marks all align with a mark alignment region in an image, an image is acquired for an embroidery frame and embroidery design sewn to a portion of a cloth mounted on the frame. Image analysis is performed based on correspondence between acquired information for the embroidery frame and for the marks. The embroidery region of the embroidery frame is determined based on analysis results. Acquired images of the cloth having the embroidery design portion and an embroidery design to be sewn to it are displayed. The embroidery design image to be sewn is edited to connect it to the image of the embroidery design already sewn to the portion in the displayed image. This prevents the occurrence of overlapping or gaps between embroidery design units even if accumulated shrinkage occurs in sewing, or slight alignment errors occur in position or rotation when cloth is mounted on the embroidery frame.

14 Claims, 20 Drawing Sheets

(51) Int. Cl.
  *G06K 9/20* (2006.01)
  *G06T 11/60* (2006.01)
(52) U.S. Cl.
  CPC .... *G06T 11/60* (2013.01); *G06T 2207/30124* (2013.01)
(58) Field of Classification Search
  USPC .................................................. 700/136–138
  See application file for complete search history.

(56) References Cited

U.S. PATENT DOCUMENTS

| | | | | |
|---|---|---|---|---|
| 5,855,176 A * | 1/1999 | Takenoya | D05B 19/08 | 112/102.5 |
| 5,911,182 A * | 6/1999 | Uyama | D05B 19/085 | 112/102.5 |
| 6,263,815 B1 * | 7/2001 | Furudate | D05B 7/00 | 112/470.13 |
| 8,061,286 B2 * | 11/2011 | Hirata | D05C 5/04 | 112/102.5 |
| 8,091,493 B2 * | 1/2012 | Tokura | D05B 19/10 | 112/470.01 |
| 8,301,292 B2 * | 10/2012 | Tokura | D05C 5/06 | 112/470.03 |
| 8,527,083 B2 * | 9/2013 | Tokura | D05B 19/10 | 112/102.5 |
| 8,738,173 B2 * | 5/2014 | Tokura | D05B 19/10 | 700/138 |
| 8,755,926 B2 * | 6/2014 | Naka | D05B 19/10 | 112/470.03 |
| 8,763,541 B2 * | 7/2014 | Tokura | D05C 5/06 | 112/102.5 |
| 8,763,542 B2 * | 7/2014 | Abe | D05B 19/04 | 112/102.5 |
| 8,857,355 B2 * | 10/2014 | Nomura | D05B 19/12 | 112/470.06 |
| 8,948,901 B2 * | 2/2015 | Tokura | D05B 19/08 | 112/102.5 |
| 9,169,588 B2 * | 10/2015 | Tokura | D05B 19/12 | |
| 9,249,533 B2 * | 2/2016 | Imaizumi | D05B 19/10 | |
| 9,267,222 B2 * | 2/2016 | Schnaufer | D05B 19/12 | |
| 9,765,460 B2 * | 9/2017 | Schwarzberger | D05B 19/08 | |
| 2008/0247651 A1 * | 10/2008 | Takaki | G06K 9/4671 | 382/219 |
| 2009/0188413 A1 * | 7/2009 | Hirata | D05B 19/10 | 112/103 |
| 2009/0188414 A1 * | 7/2009 | Tokura | D05B 19/10 | 112/457 |
| 2014/0000498 A1 * | 1/2014 | Yamanashi | D05B 19/12 | 112/102.5 |
| 2015/0005921 A1 * | 1/2015 | Abe | D05B 19/08 | 700/138 |

* cited by examiner

EMBROIDERY DESIGN CONNECTING DATA GENERATING APPARATUS, EMBROIDERY DESIGN CONNECTING DATA GENERATING METHOD, RECORDING MEDIUM FOR STORING PROGRAM, AND SEWING SYSTEM

CROSS REFERENCE TO RELATED APPLICATIONS

This application is based on and claims the benefit of priority to Japanese Patent Application No. 2016-091972 filed on Apr. 28, 2016, the contents of which are hereby incorporated by reference in their entirety.

BACKGROUND OF INVENTION

Field of the Invention

The present invention relates to an embroidery design connecting data generating apparatus, an embroidery design connecting data generating method, a recording medium for storing a program, and a sewing system.

Description of the Related Art

A stippling design is a single complicated curved pattern obtained by drawing a single curved line, which is mainly employed in quilting sewing. Typically, such a stippling design is formed manually, i.e., in a so-called free motion method.

However, such a free motion method requires a skilled operator. Otherwise, it is difficult to sew such a stippling design. In particular, it is almost impossible for an ordinary sewing machine user to operate a sewing machine to sew such a stippling design to a large quilt cloth.

In order to address such an issue, a method has been provided in which sewing of such a stippling design is performed by means of an embroidery sewing machine. However, in a case of a large embroidery design, such an arrangement cannot sew such a large design at one time. That is to say, such an arrangement requires the user to perform a sewing operation multiple times and to shift the mounting position of a sewing target such as a cloth every time one sewing operation ends. In a case of employing such a method in which sewing of an embroidery design is performed multiple times so as to provide a large embroidery design, such a method leads to issues. Examples of such issues include: an issue of overlapping between adjacent embroidery designs; and an issue of the occurrence of gaps between adjacent embroidery designs. Accordingly, it is difficult for such a method to provide a single embroidery design having high uniformity over its entire area.

In order to address such an issue, a technique has been known as disclosed in Patent document 1. That is to say, such an arrangement employs a rectangular embroidery coverage region having a pair of upper and lower sides that are opposite to each other and a pair of left and right sides that are opposite to each other. Furthermore, the stitch data of a stippling design is arranged in the rectangular embroidery coverage region such that one side is assigned to a protruding pattern of the stippling design and the side opposite to the one side is assigned to a recessed pattern of the stippling design. With such a rectangular embroidery coverage region, sewing is performed multiple times such that one side of the rectangular embroidery coverage region in the current sewing is aligned with the opposite side in the immediately previous sewing. Such an arrangement is capable of providing a single large stippling design with high uniformity over its entire area without an issue of the generation of a sense of incongruity due to overlapping between adjacent embroidery designs or the occurrence of gaps between them.

RELATED ART DOCUMENTS

Patent Documents

[Patent document 1]
Japanese Patent No. 5,687,746

However, with such a method described in Patent document 1, in the sewing operation, such an arrangement has the potential to have an issue of the occurrence of overlapping or gaps between adjacent embroidery designs due to accumulated shrinkage that occurs in the sewing operation, slight alignment errors in position or rotation that occur when a cloth is mounted on an embroidery frame, or the like.

SUMMARY OF THE INVENTION

The present invention has been made in order to address such an issue. Accordingly, it is a purpose of the present invention to provide an embroidery design connecting data generating apparatus, an embroidery design connecting data generating method, a recording medium for storing a program, and a sewing system, configured to prevent the occurrence of overlapping and gaps between adjacent embroidery designs when such sewing is performed multiple times for an embroidery design even if accumulated shrinkage occurs in the sewing operation, or even if slight alignment errors occur in position or rotation when a cloth is mounted on an embroidery frame, or the like.

Embodiment (1)

One or more embodiments of the invention provide an embroidery design connecting data generating apparatus. The embroidery design connecting data generating apparatus comprises: an embroidery frame information acquisition unit that acquires information with respect to an embroidery frame and information with respect to a mark alignment region displayed on a display unit for guiding a plurality of marks provided to the embroidery frame for defining an embroidery region of the embroidery frame; an image acquisition unit that acquires an image of the embroidery frame and an embroidery design sewn to a portion of a cloth mounted on the embroidery frame when the plurality of marks are all aligned with the mark alignment region in an image displayed on the display unit; an acquired image analyzing unit that performs image analysis for the plurality of marks in the image acquired by the image acquisition unit based on a correspondence with the information with respect to the embroidery frame acquired by the embroidery frame information acquisition unit; an embroidery region determination unit that determines the embroidery region of the embroidery frame based on an analysis result obtained by the acquired image analyzing unit; and an embroidery design image editing unit that edits an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined.

Embodiment (2)

One or more embodiments of the invention provide the embroidery design connecting data generating apparatus. The embroidery design connecting data generating apparatus comprises an embroidery design data generating unit that generates data of the embroidery design based on the information with respect to the embroidery frame.

Embodiment (3)

One or more embodiments of the invention provide the embroidery design connecting data generating apparatus. With the embroidery design connecting data generating apparatus, the embroidery design to be sewn to the cloth is the same as the embroidery design that has been sewn to the portion of the cloth.

Embodiment (4)

One or more embodiments of the invention provide the embroidery design connecting data generating apparatus. The embroidery design connecting data generating apparatus comprises an embroidery design data editing unit that edits the data of the embroidery design generated by the embroidery design data generating unit, based on the image of the embroidery design edited by the embroidery design image editing unit before it is sewn to the cloth.

Embodiment (5)

One or more embodiments of the invention provide the embroidery design connecting data generating apparatus. The embroidery design connecting data generating apparatus comprises an input operating unit that allows a user to input an operating instruction. The embroidery design image editing unit edits the image of the embroidery design to be sewn to the cloth, according to an operating instruction received via the input operating unit.

Embodiment (6)

One or more embodiments of the invention provide the embroidery design connecting data generating apparatus. The embroidery design connecting data generating apparatus comprises a sewing execution number-of-times determination unit that determines the number of times that sewing of the embroidery design is to be performed for the cloth, based on the information with respect to the embroidery frame acquired by the embroidery frame information acquisition unit and information received via the input operating unit with respect to a region of the cloth to be subjected to the embroidery sewing.

Embodiment (7)

One or more embodiments of the invention provide the embroidery design connecting data generating apparatus. With the embroidery design connecting data generating apparatus, the image acquisition unit performs image acquisition giving priority to a region of the cloth that is not adjacent to other regions thereof each having an embroidery design sewn portion.

Embodiment (8)

One or more embodiments of the invention provide the embroidery design connecting data generating apparatus. The embroidery design connecting data generating apparatus comprises an operation guidance unit that provides a user with at least one from among a guidance display and an audio guidance in the image acquisition operation of the image acquisition unit.

Embodiment (9)

One or more embodiments of the invention provide the embroidery design connecting data generating apparatus. With the embroidery design connecting data generating apparatus, the embroidery design image editing unit modifies the image of the embroidery design by shifting at least one from among a vertex or otherwise a side of the outer shape of the embroidery design in an image having a polygonal shape.

Embodiment (10)

One or more embodiments of the invention provide the embroidery design connecting data generating apparatus. The embroidery design connecting data generating apparatus comprises a gravity direction detection unit that detects a gravity direction. The display unit further displays an image acquisition orientation guidance display for guiding an alignment between an image acquisition optical axis of the image acquisition unit and the gravity direction based on a detection result obtained by the gravity direction detection unit.

Embodiment (11)

One or more embodiments of the invention provide the embroidery design connecting data generating apparatus. When the marks are aligned within the mark alignment region and when judgment has been made based on the detection result obtained by the gravity direction detection unit that the image acquisition optical axis aligns with the gravity direction, the image acquisition unit automatically performs image acquisition.

Embodiment (12)

One or more embodiments of the invention provide the embroidery design connecting data generating apparatus. The embroidery design connecting data generating apparatus comprises a correction unit configured such that, when there is an inclination between the display unit and the embroidery region thus determined in the image acquired by the image acquisition unit, the inclination is corrected.

Embodiment (13)

One or more embodiments of the invention provide an embroidery design connecting data generating method employed in an embroidery design connecting data generating apparatus. The embroidery design connecting data generating method comprises: acquiring, by an embroidery frame information acquisition unit of the embroidery design connecting data generating apparatus, information with respect to an embroidery frame and information with respect to a mark alignment region displayed on a display unit for guiding a plurality of marks provided to the embroidery frame for defining an embroidery region of the embroidery frame; acquiring, by an image acquisition unit of the embroidery design connecting data generating apparatus, an image of the embroidery frame and an embroidery design sewn to a portion of a cloth mounted on the embroidery frame when the plurality of marks are all aligned with the mark alignment region in an image displayed on the display unit; performing image analysis, by an acquired image analyzing unit of the embroidery design connecting data generating apparatus, for the plurality of marks in the image acquired by the image acquisition unit based on a correspondence with the information with respect to the embroidery frame acquired by the embroidery frame information acquisition unit; determining, by an embroidery region determination unit of the embroidery design connecting data generating apparatus, the embroidery region of the embroidery frame based on an analysis result obtained by the acquired image analyzing unit; and editing, by an embroidery design image editing unit of the embroidery design connecting data generating apparatus, an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined.

Embodiment (14)

One or more embodiments of the invention provide a recording medium for storing a program that instructs an embroidery design connecting data generating apparatus to execute an embroidery design connecting data generating method. The embroidery design connecting data generating method comprises: acquiring, by an embroidery frame information acquisition unit of the embroidery design connecting data generating apparatus, information with respect to an embroidery frame and information with respect to a mark alignment region displayed on a display unit for guiding a plurality of marks provided to the embroidery frame for defining an embroidery region of the embroidery frame; acquiring, by an image acquisition unit of the embroidery design connecting data generating apparatus, an image of the embroidery frame and an embroidery design sewn to a portion of a cloth mounted on the embroidery frame when the plurality of marks are all aligned with the mark alignment region in an image displayed on the display unit; performing image analysis, by an acquired image analyzing unit of the embroidery design connecting data generating apparatus, for the plurality of marks in the image acquired by the image acquisition unit based on a correspondence with the information with respect to the embroidery frame acquired by the embroidery frame information acquisition unit; determining, by an embroidery region determination unit of the embroidery design connecting data generating apparatus, the embroidery region of the embroidery frame based on an analysis result obtained by the acquired image analyzing unit; and editing, by an embroidery design image editing unit of the embroidery design connecting data generating apparatus, an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined.

Embodiment (15)

One or more embodiments of the invention provide a sewing system comprising an embroidery design connecting data generating apparatus and a sewing machine. The embroidery design connecting data generating apparatus comprises: an embroidery frame information acquisition unit that acquires information with respect to an embroidery frame and information with respect to a mark alignment region displayed on a display unit for guiding a plurality of marks provided to the embroidery frame for defining an embroidery region of the embroidery frame; an image acquisition unit that acquires an image of the embroidery frame and an embroidery design sewn to a portion of a cloth mounted on the embroidery frame when the plurality of marks are all aligned with the mark alignment region in an image displayed on the display unit; an acquired image analyzing unit that performs image analysis for the plurality of marks in the image acquired by the image acquisition unit based on a correspondence with the information with respect to the embroidery frame acquired by the embroidery frame information acquisition unit; an embroidery region determination unit that determines the embroidery region of the embroidery frame based on an analysis result obtained by the acquired image analyzing unit; an embroidery design image editing unit that edits an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined; and a transmission unit that transmits, to the sewing machine, image data of the embroidery design edited by the embroidery design image editing unit or otherwise embroidery design data edited based on the image of the embroidery design edited by the embroidery design image editing unit. The sewing machine comprises: a reception unit that receives image data of the embroidery design or otherwise the embroidery design data transmitted from the transmission unit; and an embroidery operation executing unit that executes an embroidery operation for the cloth mounted on the embroidery frame according to the image data of the embroidery design or otherwise the embroidery design data received via the reception unit.

With at least one embodiment of the present invention, such an arrangement provides an advantage of preventing the occurrence of overlapping or gaps after multiple embroidery designs are sewn even if accumulated shrinkage occurs in the sewing operation, or slight alignment errors occur in position or rotation when the cloth is mounted on the embroidery frame.

DETAILED DESCRIPTION

Detailed description will be made below regarding an embodiment of the present invention with reference to the drawings.

Embodiment

Description will be made with reference to FIGS. 1 through 20 regarding a sewing system according to an embodiment.

Configuration of the Sewing System

Figure 1:
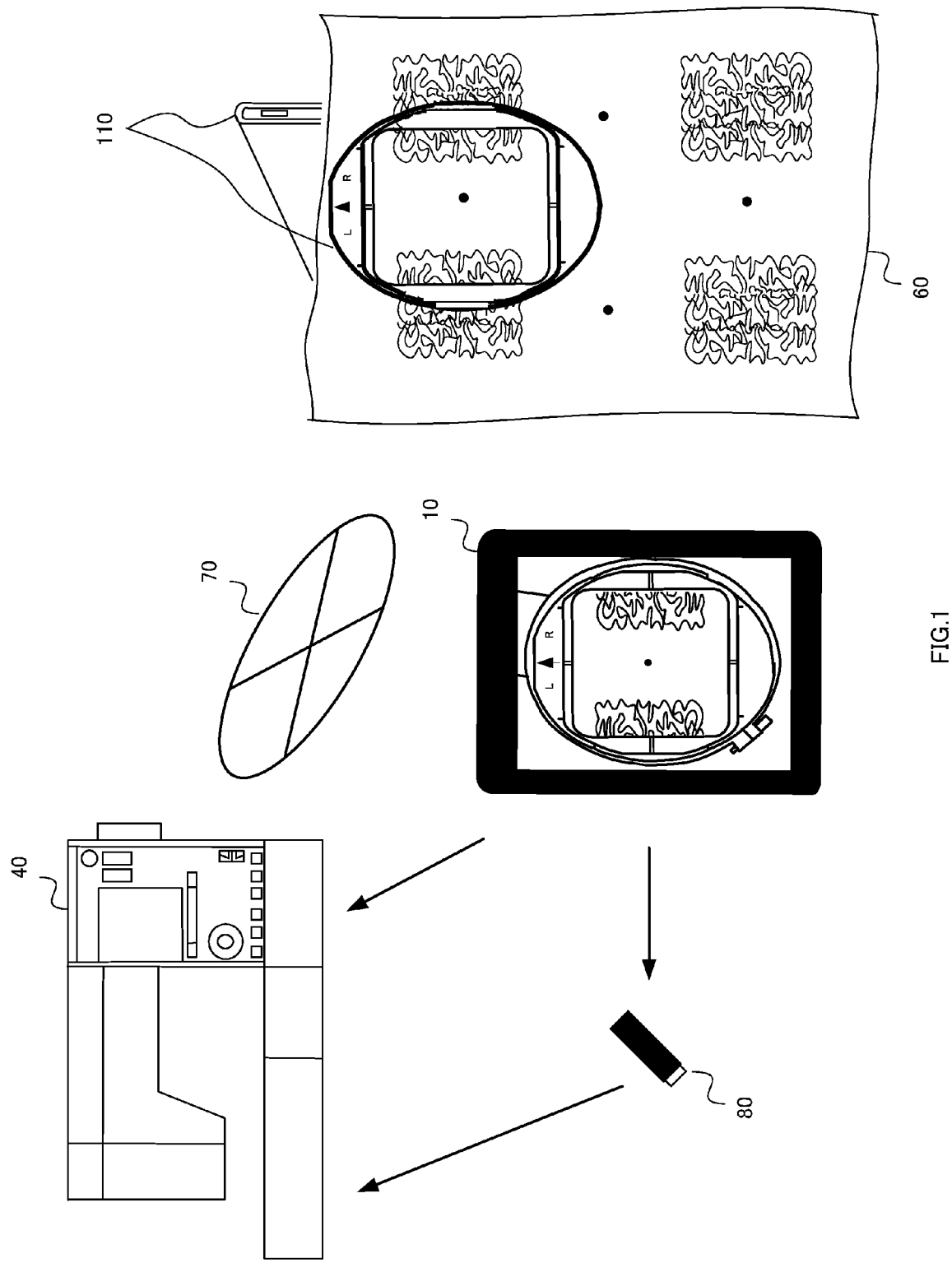
FIG. 1 is a diagram showing a schematic configuration of a sewing system according to an embodiment of the present invention.

As shown in FIG. 1, the sewing system according to the present embodiment is configured including a sewing machine and a tablet terminal 10 configured as an embroidery design connecting data generating apparatus. The sewing machine 40 and the tablet terminal 10 are connected to each other via a network such as a wireless LAN 70 or the like. It should be noted that the present embodiment is not restricted to such an arrangement employing such a network such as the wireless LAN 70 or the like. For example, a communication system may be employed using Bluetooth (trademark). Also, an off-line communication system may be employed using USB memory 80 or the like, for example.

With a sewing system according to the present embodiment, an embroidery frame having a known size is used to mount an embroidery target cloth such that the embroidery frame covers a space area (gap area) between discontinuously sewn stippling designs, for example. The embroidery frame has marks for defining the embroidery region such that it can be visually identified when the embroidery target frame is fixedly mounted. When the user specifies the embroidery frame to be used, the mark alignment region information is acquired, which is used to guide mark alignment. The display unit of the tablet terminal 10 displays a superimposed image comprising an image of the mark alignment region thus acquired used to guide the alignment of the marks provided to the embroidery frame, and an image of the embroidery target cloth mounted on the embroidery frame. The sewing system prompts the user to perform an alignment operation for the embroidery frame including the marks such that the marks are all positioned within the mark alignment region. When all the marks are positioned within the mark alignment region, the sewing system acquires an image displayed on the display unit of the tablet terminal 10. The sewing system performs image analysis based on a correspondence between the embroidery frame information thus acquired and the marks in the image acquired by the image acquisition unit of the tablet terminal 10. Subsequently, the display unit of the tablet terminal 10 displays a stitch image for an embroidery design. Furthermore, after the user adjusts the position of the stitch image, the image of the embroidery design is modified by means of calculation such that the stitch image thus modified fits the space area (gap area). Subsequently, embroidery sewing is performed for the embroidery target cloth stretched over the embroidery frame based on the embroidery design image thus modified and received by the sewing machine. Such an arrangement provides a stippling design area fitted to the adjacent stippling designs without a gap or space between them. Detailed description thereof will be made below.

Figure 2:
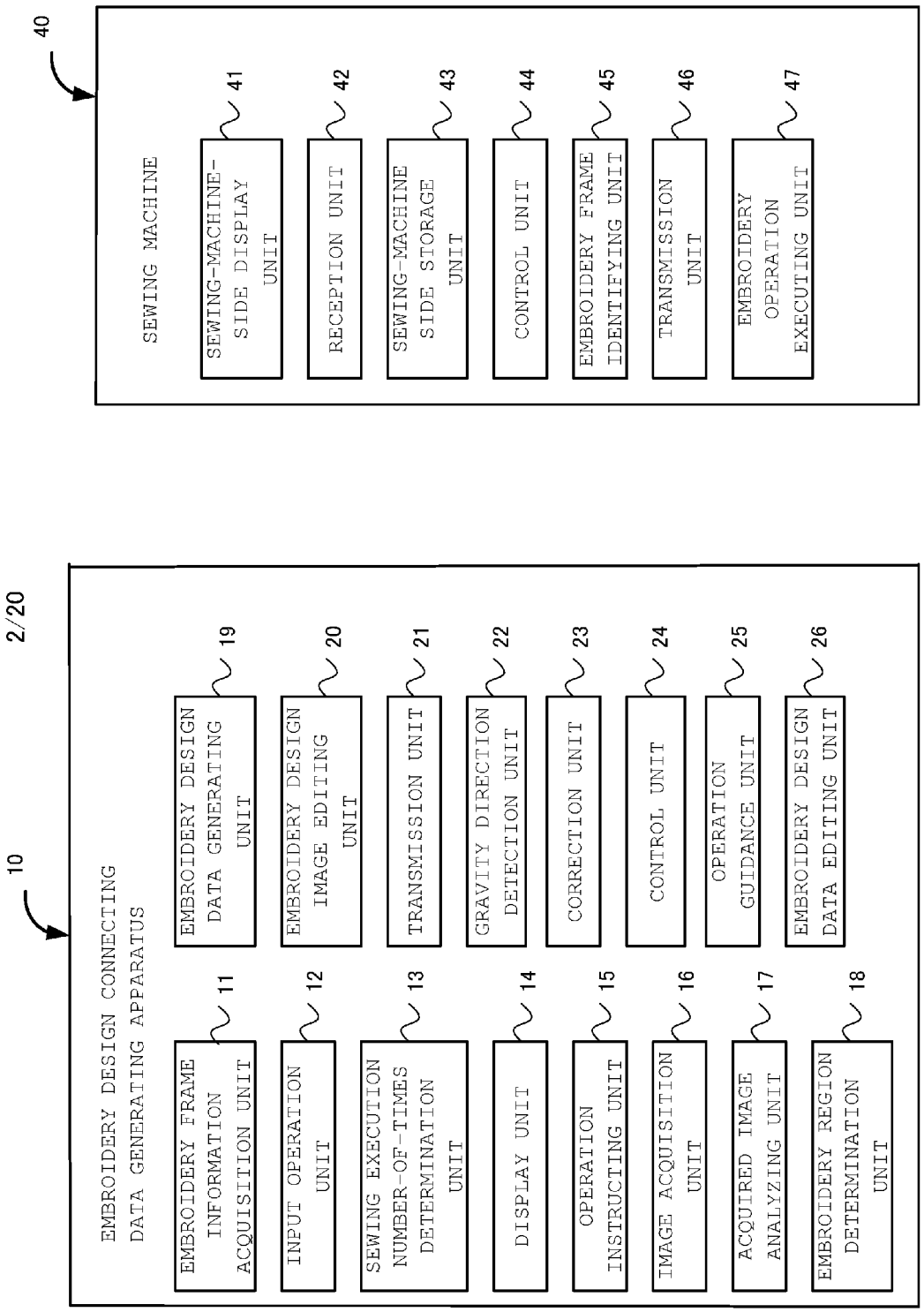
FIG. 2 is a diagram showing an electrical configuration of the sewing system according to the embodiment of the present invention.

As shown in FIG. 2, the sewing machine 40 comprises a sewing-machine-side display unit 41, a reception unit 42, a sewing-machine-side storage unit 43, a control unit 44, an embroidery frame identifying unit 45, a transmission unit 46, and an embroidery operation executing unit 47. Here, the sewing machine 40 provides semi-automatic embroidery using multiple threads having different colors according to the embroidery data, for example. In addition, the sewing machine 40 is configured as a multi-function sewing machine that supports ordinary sewing according to various kinds of sewing patterns.

The sewing-machine-side display unit 41 is provided to the sewing machine 40 itself. For example, the sewing machine-side-display unit 41 is configured as a liquid crystal display apparatus. The sewing-machine-side display unit 41 displays various kinds of information useful for the user according to the sewing machine operating state. For example, in a threading operation, the sewing-machine-side display unit 41 displays content for assisting the user to perform the threading operation. The sewing machine 40 is configured as a multi-function sewing machine. Accordingly, various kinds of content to be displayed are prepared. Also, the sewing-machine-side display unit 41 is configured as a touch panel to allow the user to input various operation instructions.

The reception unit 42 and the transmission unit 46 are connected to the tablet terminal 10 via the wireless LAN 70 or the like. This enables wireless bidirectional communication between the sewing machine 40 and the tablet terminal 10 via an unshown router or the like. It should be noted that the present invention is not restricted to such an arrangement employing a network such as the wireless LAN 70 or the like. For example, a communication system may be employed using Bluetooth (trademark). Also, an off-line communication system may be employed using the USB memory 80 or the like, for example. In the present embodiment, the reception unit 42 receives embroidery design data generated or edited by the tablet terminal 10 configured as an embroidery design connecting data generating apparatus. Otherwise, the reception unit 42 receives image data of an embroidery design edited via an embroidery design image editing unit of the tablet terminal 10.

The sewing-machine-side storage unit 43 is configured as ROM (Read Only Memory), RAM (Random Access Memory), flash memory, or the like, and stores several hundred kinds of embroidery design data, for example. Also, in addition to the designs (embroidery design data) and the information with respect to the embroidery frames stored beforehand in the sewing machine 40, the sewing-machine-side storage unit 43 may store additional designs (user-prepared designs) which are obtained by the user from external data. Also, the sewing-machine-side storage unit 43 is configured to allow the data stored in it, such as the embroidery design data, the information relating to the embroidery design data, and the information with respect to the embroidery frame, to be transmitted to the tablet terminal 10.

The control unit 44 controls the operation of the sewing machine 40 according to the control program. Furthermore, the control unit 44 performs a response operation according to an inquiry from the tablet terminal 10. In addition, the control unit 44 is capable of performing a control operation so as to allow the user to perform simple data editing operations such as selection, mixing, modification, etc., on the embroidery designs using the sewing machine 40 alone with the display function and the input function of the sewing-machine-side display unit 41.

The embroidery frame identifying unit 45 identifies the kind of the embroidery frame 110 mounted on the sewing machine 40. The embroidery frame identifying unit 45 according to the present embodiment identifies the kind of the embroidery frame 110 mounted on the sewing machine 40 by way of the kind of the embroidery frame 110 input or otherwise selected by the user via the sewing-machine-side display unit 41. It should be noted that the method used by the embroidery frame identifying unit 45 for identifying the embroidery frame is not restricted to such an arrangement. Also, the kind of the embroidery frame 110 mounted on the sewing machine 40 may be identified using an IC chip or a contact circuit.

The sewing operation executing unit 47 executes a sewing operation for an embroidery target cloth stretched over the embroidery frame 110 such that the adjacent embroidery designs are connected to each other so as to form a single stippling design according to the edited embroidery design data acquired from the tablet terminal 10 via the reception unit 42.

The tablet terminal 10, which is employed as the embroidery design connecting data generating apparatus, may be configured as a commercially available general-purpose tablet terminal. Before such a tablet terminal 10 is used as the embroidery design connecting data generating apparatus according to the present embodiment, a program (application program) for detecting an embroidery region is installed and executed on the tablet terminal 10.

It should be noted that such a program may be recorded on a recording medium such as a flash memory device or the like. Also, such a program may be obtained by downloading via various kinds of known networks. It should be noted that description is being made in the present embodiment regarding such a tablet terminal 10 as a specific example of the embroidery design connecting data generating apparatus. However, the present invention is not restricted to such an arrangement. Also, a smartphone may be employed, for example. Alternatively, a camera or the like having a function required to function as the embroidery design connecting data generating apparatus may be employed, which is mounted on the sewing machine by means of a mechanism that allows it to be fixedly mounted at a position where it can acquire an image of the overall area of the embroidery frame.

As shown in 2, the tablet terminal 10 is configured including an embroidery frame information acquisition unit 11, an input operating unit 12, a sewing execution number-of-times determination unit 13, a display unit 14, an operation instructing unit 15, an image acquisition unit 16, an acquired image analyzing unit 17, an embroidery region determination unit 18, an embroidery design data generating unit 19, an embroidery design image editing unit 20, a transmission unit 21, a gravity direction detection unit 22, a correction unit 23, a control unit 24, an operation guidance unit 25, and an embroidery design data editing unit 26.

The embroidery frame information acquisition unit 11 acquires information with respect to the kind of the embroidery frame 110 and the mark alignment region information with respect to a region for guiding an alignment operation for the marks provided to the embroidery frame 110 at particular positions that allow them to be visually identified for defining an embroidery region when an embroidery target cloth is fixedly mounted.

Figure 5:
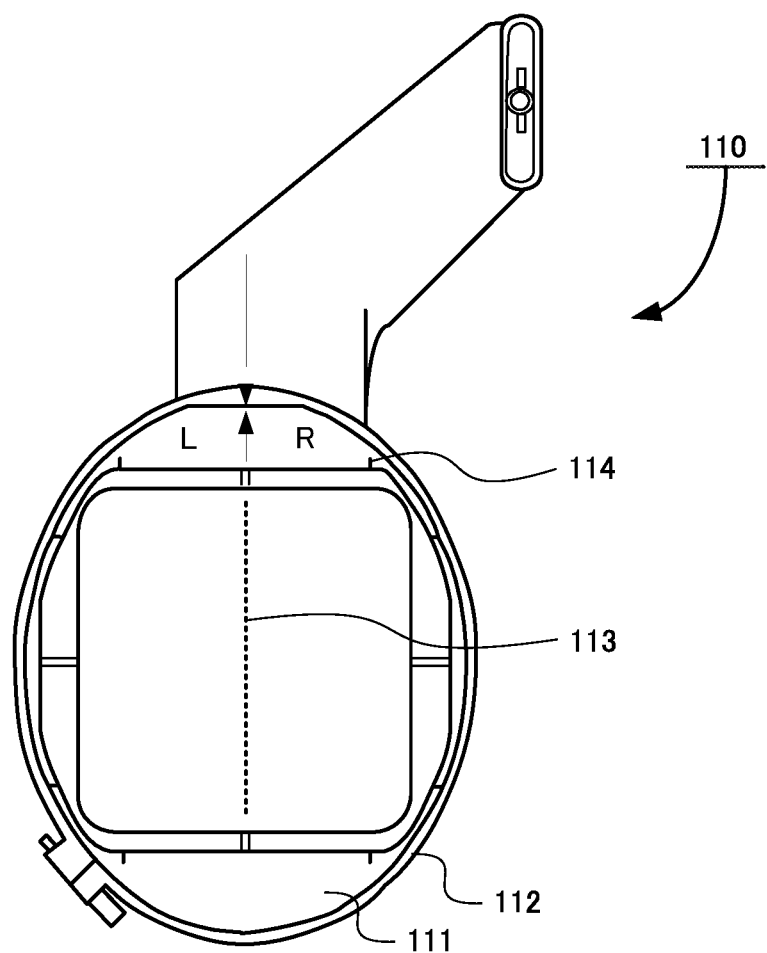
FIG. 5 is a diagram showing an example of an embroidery frame according to the embodiment of the present invention.
Figure 16:
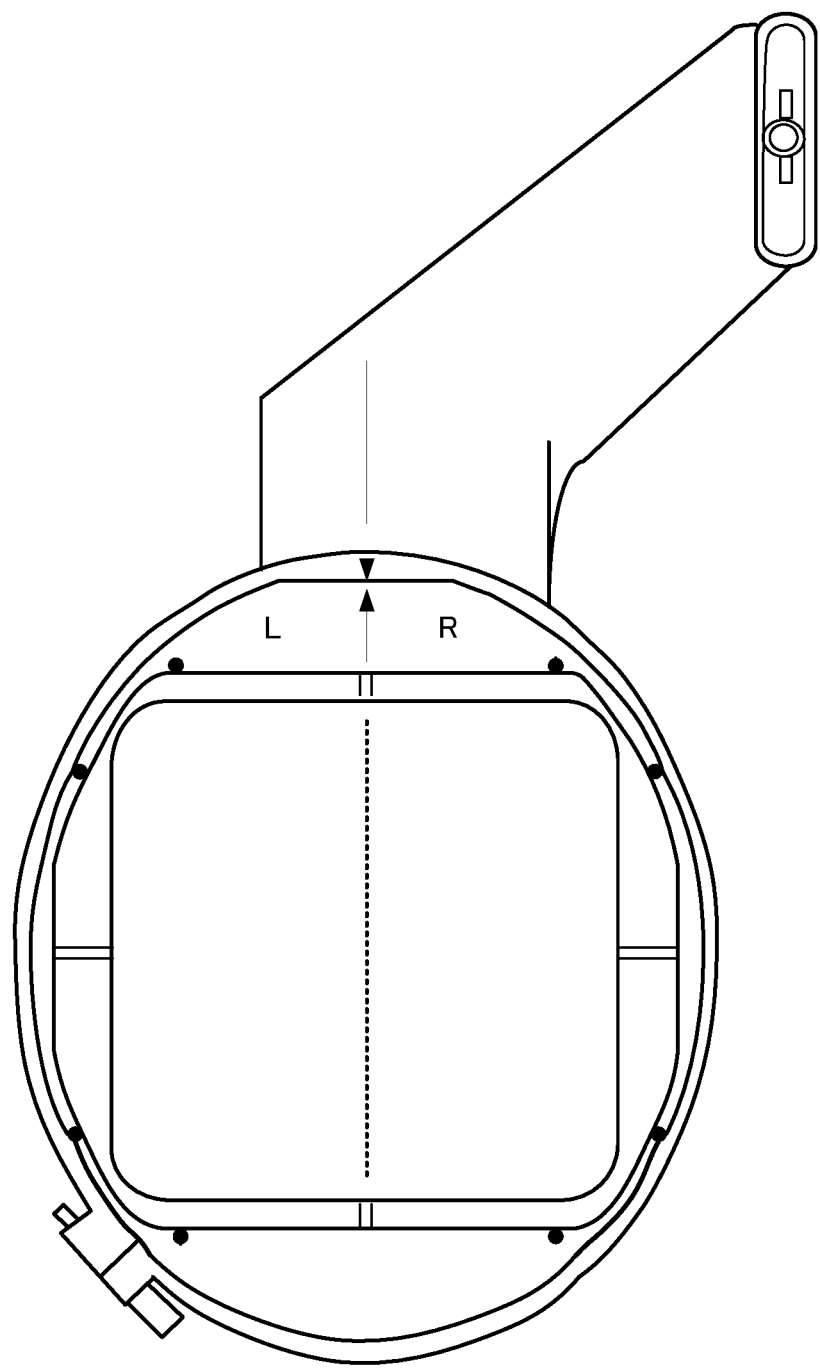
FIG. 16 is a diagram showing an example of a different kind of the embroidery frame according to the embodiment of the present invention.

The embroidery frame information acquisition unit 11 acquires the information with respect to the kind of the embroidery frame and the mark alignment region information with respect to a region for guiding an alignment operation for the marks provided to the embroidery frame at particular positions that allow them to be visually identified for defining an embroidery region when an embroidery target cloth is fixedly mounted. As shown in FIG. 5, the embroidery frame 110 employed in the present embodiment is formed of an inner frame 111, an outer frame 112, and embroidery region marks 114. The embroidery region marks 114 are formed in the form of short lines that pass through the embroidery frame such that they are arranged on lines that extend along the four sides of the embroidery region having a rectangular shape defined by the inner frame 111 of the embroidery frame 110. Furthermore, the embroidery region marks 114 are each formed as a mark in the form of a short straight line on the inner frame 111 of the embroidery frame 110. Description is being made in the embodiment regarding an arrangement including eight embroidery region marks 114 each formed as a mark in the form of a vertical line or otherwise a horizontal line on the inner frame 111. It should be noted that description is being made for exemplary purposes regarding the embroidery frame 110 comprising the inner frame 111 and the outer frame 112 formed as separate frames. Also, the embroidery frame 110 may have a hinge structure in which such a pair of frames includes a coupling portion such that, by turning one frame, the two frames overlap. Also, as shown in FIG. 16, each of the embroidery region marks 114 may be configured to differ in terms of at least one property from among the color and shape according to the kind of the embroidery region marks 114. As described above, by configuring the embroidery region marks 114 to have different colors or shapes according to the kind of the embroidery region marks 114, such an arrangement allows the image to be easily recognized. Description is being made in the present embodiment for exemplary purposes regarding an arrangement in which the embroidery region is configured to have a rectangular shape. Also, by providing additional embroidery region marks to the eight embroidery region marks 114 according to the present embodiment, such an arrangement is applicable to a case in which the embroidery region has other shapes such as a polygonal shape, circular shape, semi-circular shape, or the like. Also, in order to support various kinds of embroidery regions, other kinds of marks may be arranged according to the various kinds of embroidery regions. In this case, such marks may preferably be designed to have a color or a shape that is defined according to the embroidery region. As described above, by providing the embroidery frame with such marks that support multiple embroidery regions, such an arrangement allows the kinds of the embroidery frames to be reduced to a minimum. Also, by configuring the marks to have different colors or shapes according to multiple different embroidery regions, such an arrangement allows the marks to be identified in a simple manner in the image processing operation.

The input operation unit 12 allows the user to input operating instructions. In the present embodiment, the input operation unit 12 receives: information with respect to the size of the embroidery region; and information with respect to editing of the embroidery design data with respect to the embroidery frame. The sewing execution number-of-times determination unit 13 determines the number of times the embroidery design sewing is to be performed, based on the embroidery frame information acquired by the embroidery frame information acquisition unit 11 and the size of the embroidery region received via the input operation unit 12.

The display unit 14 displays a superimposed image comprising an image of the mark alignment region (shaded area in FIG. 9) for guiding the embroidery marks 114 of the embroidery frame 110 acquired by the embroidery frame information acquisition unit 11, an image of the embroidery frame 110 including the embroidery region marks 114, and an image of the embroidery target cloth having discontinuously sewn stippling designs mounted on the embroidery frame 110. Furthermore, the display unit 14 displays an image acquisition orientation guiding display for guiding the alignment between the image acquisition optical axis of the image acquisition unit 16 and the gravity direction based on the detection result obtained by the gravity direction detection unit 22 described later. By providing such a guidance display, such an arrangement allows the user to easily set the tablet terminal 10 in the horizontal state. It should be noted that, in addition to a function for displaying such various kinds of images, the display unit 14 is configured including an unshown operating unit in order to function as a touch panel. In addition to displaying such information, the display unit 14 allows the user to input various kinds of operation instructions.

The operation instructing unit 15 prompts the user to perform a positioning operation for the embroidery frame 110 including the embroidery region marks 114 such that all the embroidery region marks 114 are each positioned within the corresponding mark alignment region. It should be noted that such an arrangement may provide a guidance display or otherwise audio guidance, etc., in order to prompt the user to perform the positioning operation. By providing such a guidance display or otherwise audio guidance, etc., such an arrangement allows the user to easily perform the positioning operation even if the user is inexperienced in the use of the tablet terminal 10.

When all the embroidery region marks 114 are each positioned within the corresponding mark alignment region, the image acquisition unit 16 acquires an image displayed on the display unit 14. It should be noted that, in actuality, the user performs image acquisition using the tablet terminal 10 held in the user's hands. Also, the image acquisition may be automatically performed when judgment has been made that the embroidery region marks 114 are each positioned within the corresponding mark alignment region and judgment has been made based on the detection result obtained by the gravity direction detection unit 22 described later that the image acquisition optical axis is aligned with the gravity direction. As described above, by automatically acquiring an image by means of image analysis, such an arrangement is capable of preventing degradation in image quality due to camera shake or the like, thereby providing high-precision image acquisition. Furthermore, the image acquisition unit 16 repeatedly performs image acquisition with priority given to a region that is not adjacent to other regions to be subjected to the embroidery design sewing in the subsequent operation every time the sewing machine 40 executes the embroidery design sewing. The number of times the image acquisition is to be performed matches the number of times the embroidery design sewing is to be executed, which is determined by the sewing execution number-of-times determination unit 13. In this step, the image acquisition unit 16 automatically performs image acquisition when judgment has been made that the embroidery frame 110 is aligned with the reference embroidery frame in the image. As described above, by automatically acquiring an image when judgment has been made that the two images have been aligned with each other, such an arrangement is capable of preventing degradation in image quality due to camera shake or the like. This allows the user to perform accurate image acquisition even if the user is inexperienced in the image acquisition operation via the tablet terminal 10.

The acquired image analyzing unit 17 performs image analysis based on the correspondence between the information with respect to the embroidery frame 110 acquired by the embroidery frame information acquisition unit 11 and the embroidery region marks 114 in the image acquired by the image acquisition unit 16. Specifically, the acquired image analyzing unit 17 performs thinning image processing on the acquired image of the embroidery region marks 114. This allows the embroidery region to be identified and determined.

The embroidery region determination unit 18 determines the embroidery region based on the analysis result obtained by the acquired image analyzing unit 17.

The embroidery design data generating unit 19 generates embroidery design data for the overall embroidery area based on the information with respect to the embroidery frame acquired by the embroidery frame information acquisition unit 11 and the size of the area of the cloth to be subjected to embroidery received via the input operation unit 12. It should be noted that description is being made in the present embodiment regarding an arrangement in which embroidery sewing is repeatedly performed for a single design such as a stippling design or the like having the same shape and the same size, so as to form a single embroidery design over the entire area. Also, such embroidery sewing may be performed for multiple designs having the same shape and different sizes, so as to form a single embroidery design over the entire area. Also, such embroidery sewing may be performed for multiple designs having different shapes, so as to form a single embroidery design over the entire area. Specifically, embroidery sewing may be performed such that a triangular design is provided at a position adjacent to a rectangular design, for example.

The embroidery design image editing unit 20 edits an embroidery design image to be provided to the cloth such that it is connected with another embroidery design that has already been sewn to a portion of the cloth in the image displayed on the display unit 14. Specifically, by shifting at least one from among a vertex or otherwise a side of the outer shape of the embroidery design having a polygonal shape displayed on the display unit, the embroidery design image editing unit 20 edits and modifies the embroidery design image. Furthermore, the embroidery design data editing unit 26 edits and modifies the embroidery design data based on the embroidery design image thus edited.

The transmission unit 21 transmits, to the sewing machine 40, the data of the embroidery design image edited by the embroidery design image editing unit 20 or otherwise the embroidery design data edited based on the image of the embroidery design edited by the embroidery design image editing unit 20.

The gravity direction detection unit 22 detects the gravity direction with respect to the tablet terminal 10, so as to detect the inclination of the tablet terminal 10 with respect to the horizontal axis. The user is able to monitor, via the acquired image orientation guidance display, the detection result obtained by the gravity direction detection unit 22.

Also, the gravity direction detection unit 22 may be configured as a level sensor, a geomagnetic sensor, or the like. By providing the gravity direction detection unit 22, such an arrangement allows the user to easily hold the tablet terminal 10 in a horizontal state. When the embroidery region in the image acquired by the image acquisition unit 16 is inclined with respect to the display screen of the display unit 14, the correction unit 23 performs correction for the inclination. By performing such correction, such an arrangement is capable of providing embroidery with high-precision positioning in the embroidery region.

The control unit 24 controls the overall operation of the embroidery design connecting data generating apparatus. Furthermore, the embroidery design connecting data generating apparatus includes an unshown storage unit configured as ROM (Read Only Memory), RAM (Random Access Memory), flash memory, or the like, and stores various kinds of data such as image data acquired by the image acquisition unit 16 and the like. It should be noted that, with the present embodiment, examples of such data stored in the storage unit include the embroidery frame information, embroidery frame image, mark alignment region image, gravity direction determination image, operation guidance program, audio data, display data, and the like.

The operation guidance unit 25 provides guidance to the user in the form of at least one from among a guidance display and audio guidance, in order to instruct the user to repeatedly perform image acquisition multiple times with priority given to a region that is not adjacent to other regions to be subjected to the embroidery design sewing in the subsequent operation. The number of times the image acquisition is to be performed corresponds to the number of times sewing of the embroidery design is to be executed, which is determined by the sewing execution number-of-times determination unit 13. By providing such a guidance display or audio guidance before the user performs such an operation, such an arrangement allows the user to easily perform the positioning operation with the tablet terminal 10 even if the user is inexperienced in the use of the tablet terminal 10.4

Operation of the Sewing System

Description will be made with reference to FIGS. 3 through 20 regarding the operation of the sewing system according to the present embodiment.

After the sewing application installed on the tablet terminal 10 is started up, the user inputs the information with respect to the area of the embroidery target cloth to be subjected to the embroidery (Step S101). Specifically, as shown in FIG. 16, the user specifies the vertical length and the horizontal length as the size of the area of the embroidery target cloth to be subjected to embroidery. Description will be made below regarding an example in which the user inputs the horizontal length W=570 mm and the vertical length H=630 mm.

Figure 3:
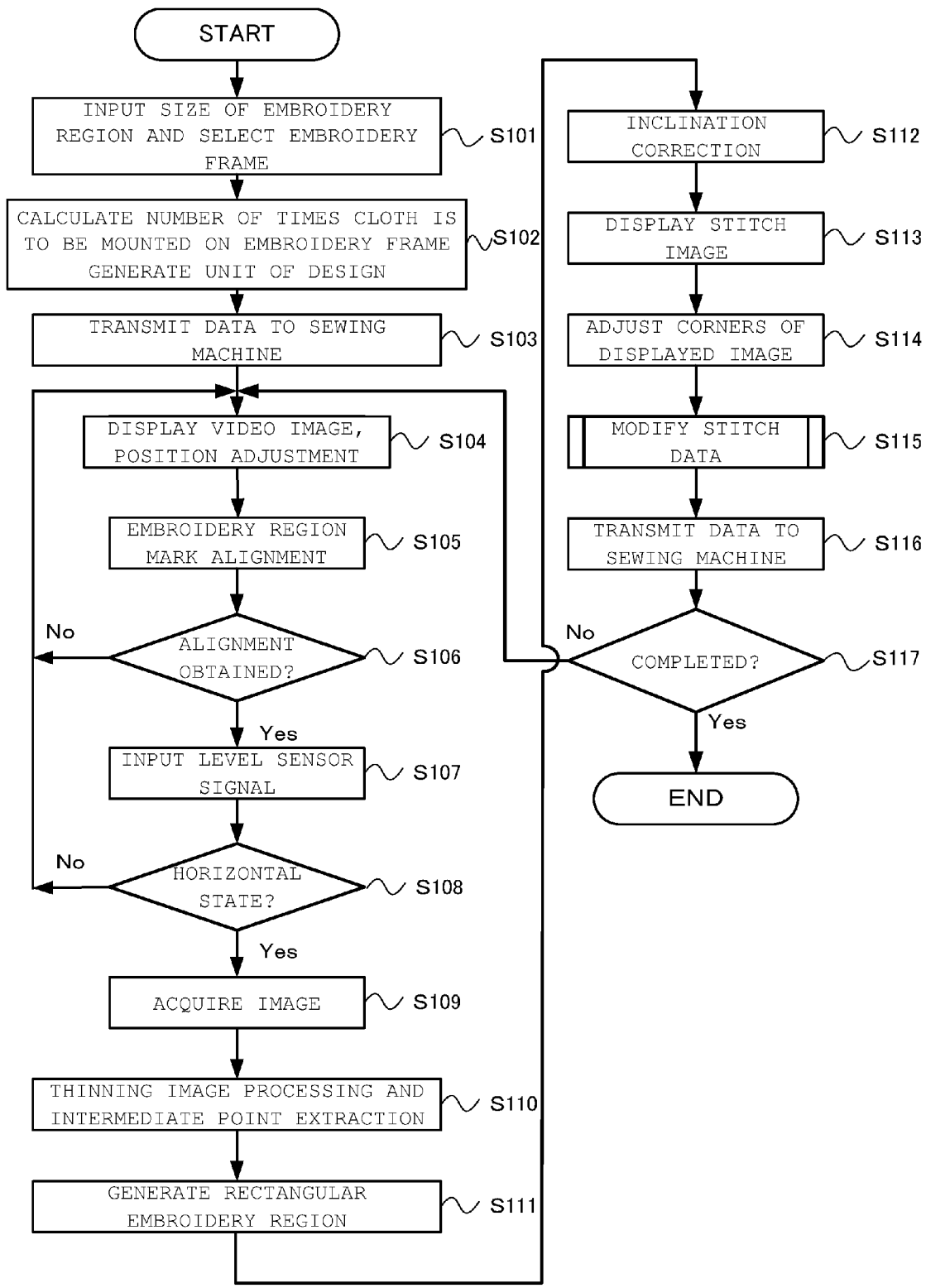
FIG. 3 is a diagram showing an operation of the sewing system according to the embodiment of the present invention.
Figure 6:
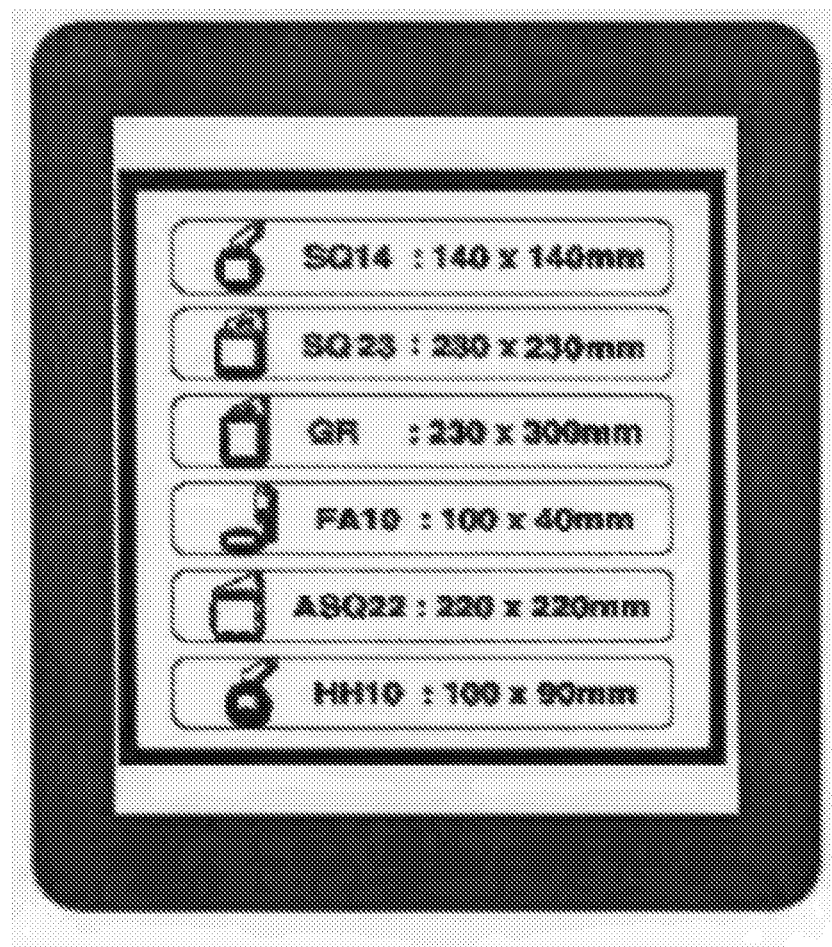
FIG. 6 is a diagram showing an example of a state according to the embodiment of the present invention in which multiple kinds of embroidery frames are displayed on a display screen of the embroidery design connecting data generating apparatus in order to enable selection of the embroidery frame.
Figure 7:
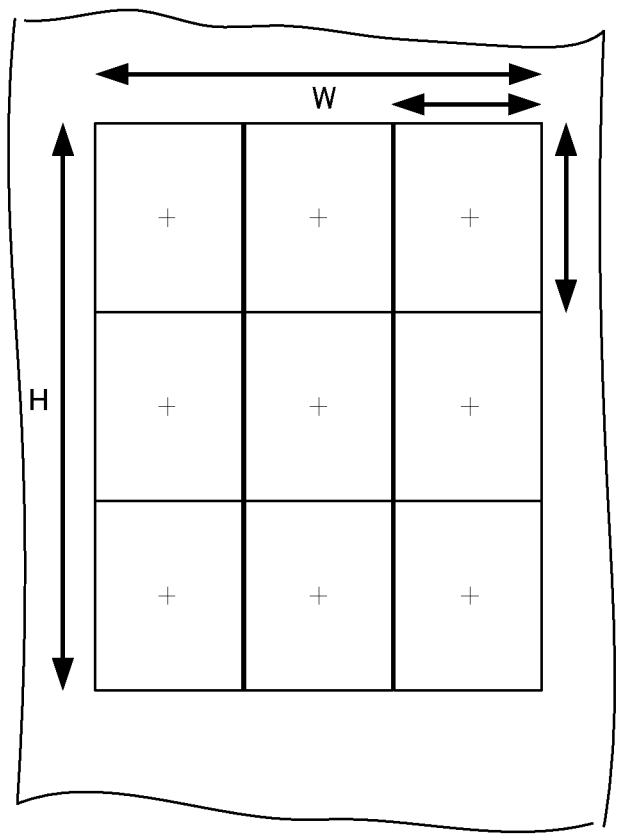
FIG. 7 is a diagram showing an example of a layout of a stippling design on a cloth before a decision according to the embodiment of the present invention.

As shown in FIG. 3, when the user opens a frame type selection menu after the application installed on the tablet terminal 10 is started up, the display unit 14 of the tablet terminal 10 displays a frame type list that allows the user to select the embroidery frame 110 as shown in FIG. 6. The user selects a desired embroidery frame from among the frame items displayed on the list (Step S101). Description will be made below regarding a case in which the frame type GR is selected. It should be noted that the unshown storage unit stores the data such as the sizes of the various kinds of the embroidery frame 110. Also, such data may be acquired via communication with the sewing machine 40 or otherwise a server or the like connected to different networks. It should be noted that description has been made above regarding an arrangement in which the user specifies the kind of the embroidery frame 110. Also, the embroidery frame information acquisition unit 11 may identify the kind of the embroidery frame 110 to be used in embroidery based on the image acquired by the image acquisition unit 16, and may acquire the information with respect to the embroidery frame 110 thus identified. For example, the image acquired by the image acquisition unit 16 may be analyzed so as to identify the kind of the embroidery frame 110 based on the shape of the embroidery frame 110 in the acquired image. Also, image recognition may be performed for a text, barcode, or the like, provided on the embroidery frame 110, so as to identify the kind of the embroidery frame 110.

Judgement is made based on the information with respect to the area of the cloth to be subjected to the embroidery sewing input by the user whether or not each stippling embroidery design can be accommodated within the area of the cloth thus specified. The judgment is sequentially made for the multiple stippling designs having different patterns prepared beforehand in descending order of the size of the embroidery design. When judgment has been made that a given embroidery design can be approximately accommodated within the area, size adjustment is performed within ±10% so as to provide an embroidery design having an appropriate size. In this stage, the number of times the cloth is mounted on the embroidery frame (the number of times the embroidery sewing is performed) and the embroidery design are determined (Step S102). For example, in a case of employing stippling data for an embroidery design having a size of 200 mm×200 mm, there is a need to arrange (3×3) embroidery designs in both the vertical direction and the horizontal direction. In this case, the original embroidery design has a horizontal length that is greater than those of the embroidery designs to be arranged. Thus, the size of the original embroidery design is reduced to 95% in the horizontal direction. On the other hand, the original embroidery design has a vertical length that is smaller than those of the embroidery designs to be arranged. Thus, the size of the original embroidery design is enlarged to 105% in the vertical direction. That is to say, in this case, such an arrangement generates a modified embroidery design having a size of 190 mm×210 mm.

Figure 8:
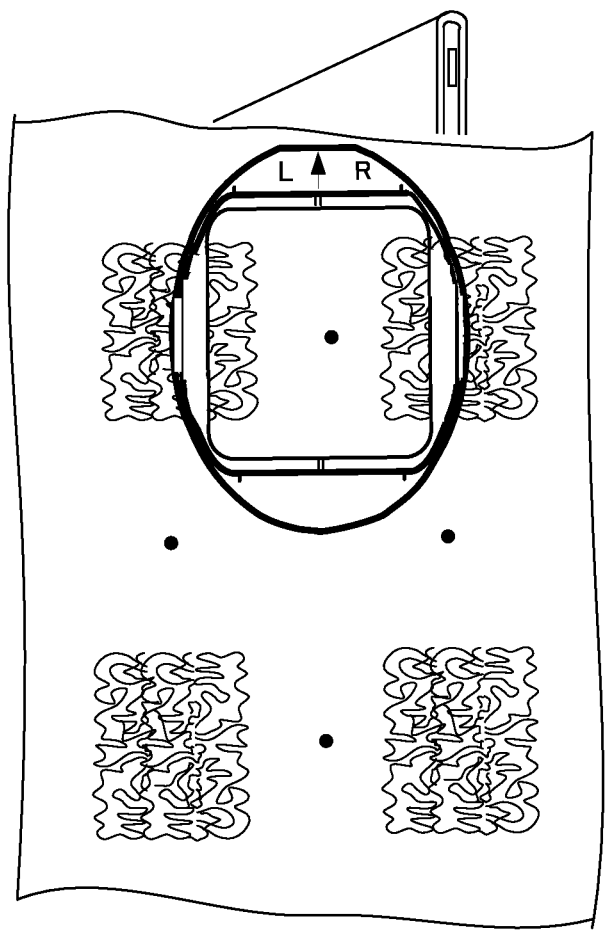
FIG. 8 is a diagram showing an example method according to the embodiment of the present invention for sewing a stippling design in the form of a single continuous design.

The embroidery design data generated in Step S102 is transmitted via the transmission unit 21 to the sewing machine 40 (Step S103). For example, in a case in which the embroidery design sewing is performed (3×3) times in units of the size thus specified along the horizontal direction and the vertical direction, and in a case in which the portion of cloth mounted on the embroidery frame is replaced by a subsequent portion every time the design connecting sewing is performed, a mark is provided to each center position of nine design areas each of which is to be mounted on the embroidery frame 110. First, as shown in FIG. 8, the stippling design having a size of 190 mm×210 mm determined in Step S102 is sewn in each of the four design areas positioned at the four corners of the cloth from among the nine design areas of the cloth thus marked. The design area of the cloth is mounted on the embroidery frame 110 such that the corresponding mark matches the center of the embroidery frame 110 before the stippling design is sewn.

Figure 9:
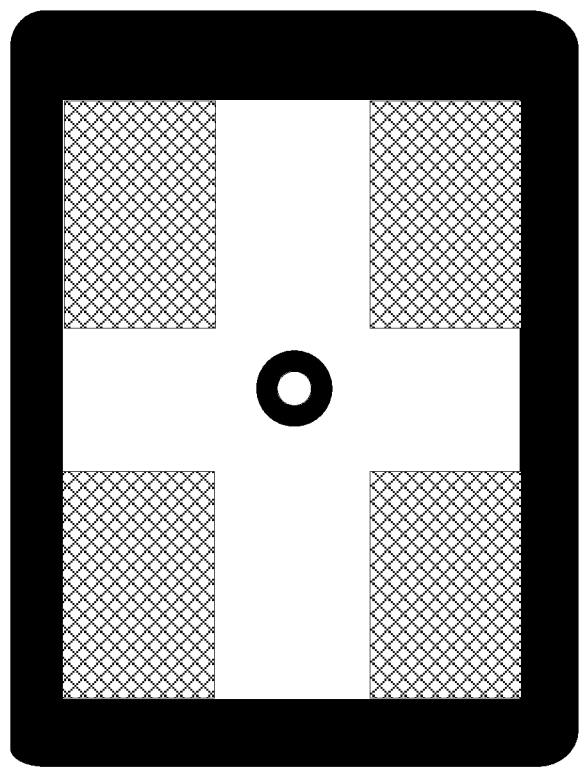
FIG. 9 is a diagram showing an example of an embroidery region mark alignment region displayed on a display screen of the embroidery design connecting data generating apparatus according to the embodiment of the present invention.
Figure 10:
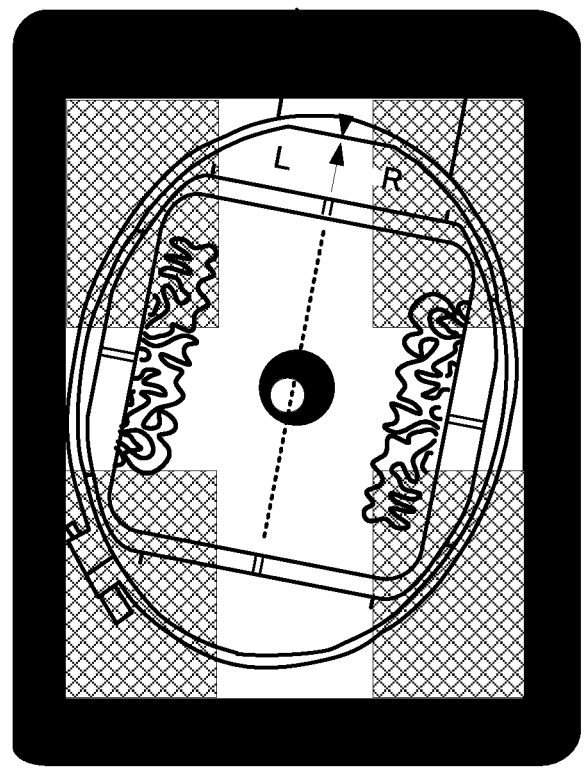
FIG. 10 is a diagram showing an example of a state in which a tablet terminal deviates from the horizontal state in the alignment operation in which an embroidery frame image is aligned with an embroidery region mark alignment region displayed on a display screen of the embroidery design connecting data generating apparatus according to a first embodiment of the present invention.
Figure 11:
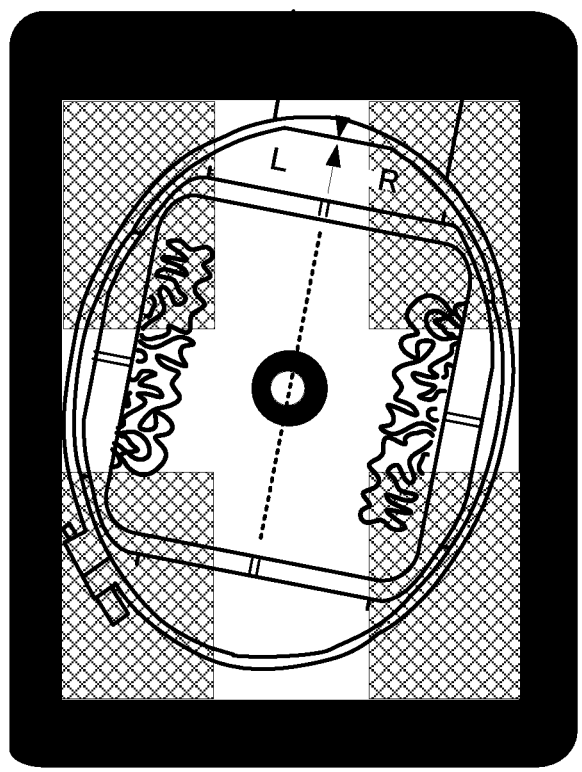
FIG. 11 is a diagram showing an example of a state in which a tablet terminal is in the horizontal state in the alignment operation in which an embroidery frame image is aligned with an embroidery region mark alignment region displayed on a display screen of the embroidery design connecting data generating apparatus according to the first embodiment of the present invention.

As shown in FIG. 8, the user sets the embroidery frame 110 such that it aligns with a space area between discontinuously sewn stippling designs. Subsequently, the user places the embroidery frame 110 in a horizontal position. In this step, the embroidery target cloth is mounted on the embroidery frame 110 such that the mark provided to the center position of the space area (gap area) approximately matches the center position of the embroidery frame. When the user holds the tablet terminal 10 such that it faces the embroidery frame 110 mounting the embroidery target cloth, the image acquisition unit 16 starts up, and the display unit 14 of the tablet terminal 10 displays a screen as shown in FIG. 9. Furthermore, the display unit 14 displays a real-time image as a superimposed image (Step S104). FIG. 9 shows an image including: an image of the image acquisition alignment regions positioned on four corners thereof for the embroidery region marks defined beforehand according to the embroidery frame 110 type; and an image of a level indicator on the central portion thereof that indicates the degree of horizontally of the tablet terminal 10. When the inner circle shown as a white circle is aligned with the center of the outer circle after the user adjusts the level of the tablet terminal 10, this indicates that the tablet terminal 10 has come to be in a horizontal state. The user adjusts the position of the tablet such that the eight embroidery region marks 114 are all positioned within the image acquisition alignment regions for the embroidery region marks, and such that the inner circle shown as a white circle configured as a level indicator is aligned with the center of the outer circle. It should be noted that an image input in a real-time manner may be analyzed so as to automatically detect whether or not the embroidery region marks 114 are each positioned in a corresponding narrow region (shaded region in FIGS. 10 and 11) defined beforehand according to the kind of the embroidery frame 110. Such an arrangement may notify the user of the detection result by means of a buzzer or the like.

The user holds the tablet terminal 10 such that it is positioned above the embroidery frame 110 over which the embroidery target cloth has been stretched. Judgement is made, by means of image processing, regarding whether or not all the embroidery region marks 114 provided to the inner frame 111 are each positioned within the corresponding one of the embroidery region mark alignment regions for the embroidery region marks 114 provided to the four corners of the display unit 14 of the tablet terminal 10 (Step S105). When judgement has been made that the embroidery region marks 114 are not each positioned within the corresponding embroidery region mark alignment region ("NO" in Step S106), the flow returns Step S104, and image acquisition is performed again.

When judgement has been made that each embroidery region mark 114 is positioned within the corresponding embroidery region mark alignment region ("YES" in Step S106), the flow proceeds to Step S107 in which the sensor value of the level sensor is read out (Step S107) and judgment is made whether or not the tablet terminal 10 is in a horizontal state (Step S108). When judgment has been made that the tablet terminal 10 is not in a horizontal state ("NO" in Step S108), the flow returns to Step S104, and the image acquisition is performed again. When judgment has been made that the tablet terminal 10 is in a horizontal state ("YES" in Step S108), judgement is made that the image acquisition condition has been satisfied. In this case, the flow proceeds to Step S109 in which the image displayed in this stage is acquired and stored in the memory as the image data.

Figure 12:
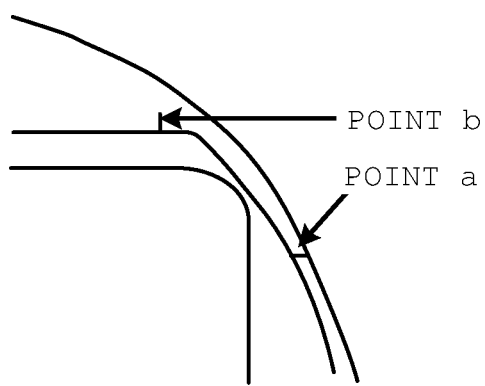
FIG. 12 is a diagram showing an example of a state according to the embodiment of the present invention in which thinning image processing is performed on the marks provided to the embroidery frame.
Figure 13:
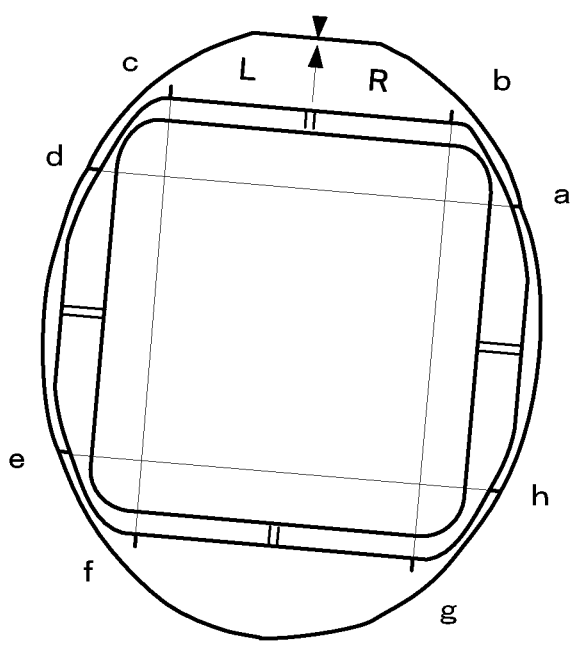
FIG. 13 is a diagram showing an example of a state according to the embodiment of the present invention in which a line is defined between each pair of opposing marks provided to the embroidery frame.

The embroidery region marks 114 printed on the inner frame 111 of the embroidery frame 110 each have a given thickness and a given length. Accordingly, as shown in FIG. 12, thinning image processing is performed (Step S110). Subsequently, the coordinate position of an intermediate point is acquired for each of the eight lines. Furthermore, as shown in FIG. 13, lines are defined such that they pass through a pair of opposing intermediate points thus acquired. That is to say, such lines are defined based on the coordinate positions of the points a through h.

Four equations are derived based on the coordinate positions of the points a through h, such that they represent the four lines, i.e., the line a-d, the line h-e, the line b-g, and the line c-f. Next, the equations are solved so as to calculate the intersection for each pair of lines that are orthogonal to each other, i.e., the intersections between the line a-d and the line b-g, between the line a-d and the line c-f, between the line c-f and the line h-e, and between the line h-e and the line b-g. With the intersection between the line a-d and the line b-g as k, with the intersection between the line a-d and the line c-f as 1, with the intersection between the line c-f and the line h-e as m, and with the intersection between the line h-e and the line b-g as n, lines are defined such that they pass through the intersections as shown in FIG. 14, thereby defining the embroidery region having a rectangular shape (Step S111).

Figure 14:
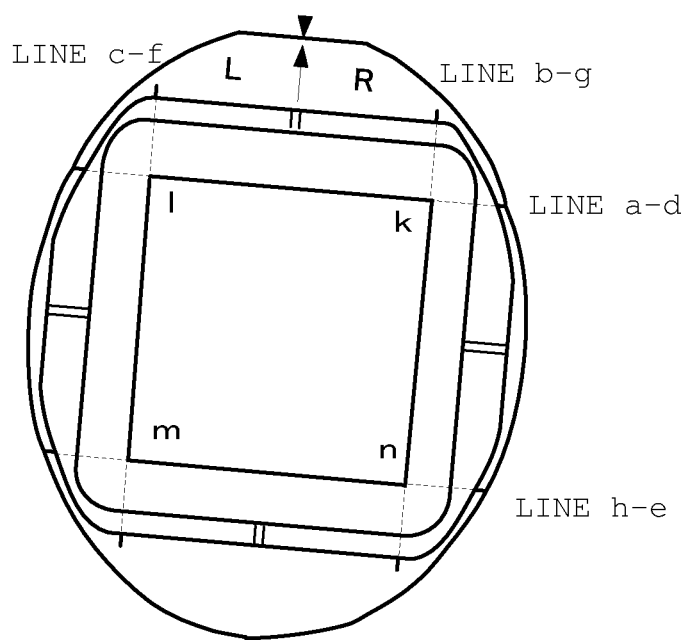
FIG. 14 is a diagram showing an example of a state according to the embodiment of the present invention in which a line is defined between each pair of opposing marks, intersections are calculated based on the lines thus defined, and a line is defined between each pair of intersections so as to determine a rectangular embroidery region.
Figure 15:
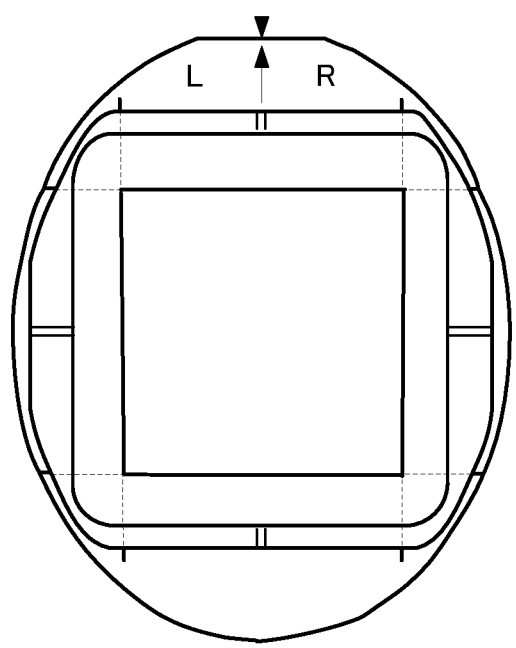
FIG. 15 is a diagram showing an inclination correction according to the embodiment of the present invention performed after the rectangular embroidery region is determined.

FIG. 14 shows an example case in which the tablet terminal 10 is held by the user in an inclined manner. Accordingly, the acquired image has a corresponding inclination, leading to the image of the embroidery region having the same inclination. In order to address such an issue, the inclination is corrected, i.e., rotation correction is performed such that the acquired image is aligned with the center axis of the tablet terminal, thereby providing the screen display as shown in FIG. 15 (Step S112).

Figure 17:
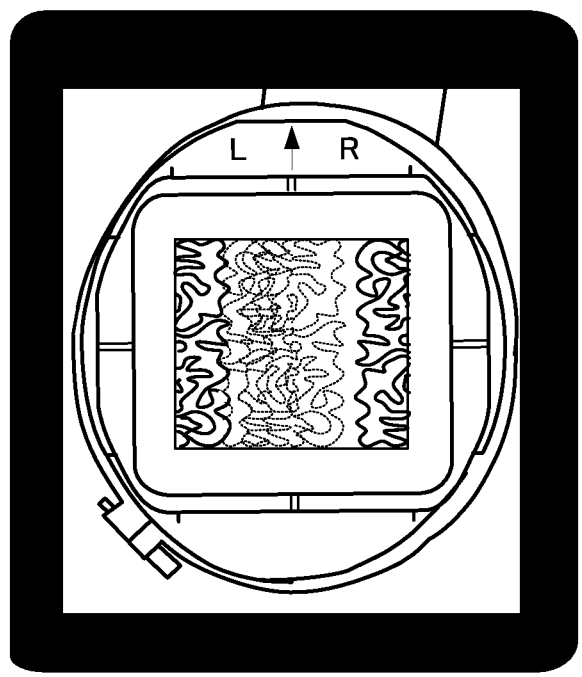
FIG. 17 is a diagram showing an example of a state according to the embodiment of the present invention in which the embroidery design connecting data generating apparatus displays, on its display screen, a combination of a stitch image of a stippling design to be sewn in the subsequent step and an acquired image of the embroidery frame and an embroidery target cloth.

The stitch image that forms the embroidery design is displayed in the space area (gap area) on the display screen of the tablet terminal 10 (Step S113). If the previous stippling designs have been accurately provided in the embroidery sewing without involving the occurrence of shrinkage that occurs in the sewing operation or the like, the video images of the stippling designs acquired by the camera are displayed together with the stitch image such that they are arranged without a gap. However, in many cases, as shown in FIG. 17, they are arranged with a non-negligible gap due to shrinkage that occurs in the sewing operation, alignment errors that occur when the embroidery target cloth is mounted on the embroidery frame, or the like.

Figure 4:
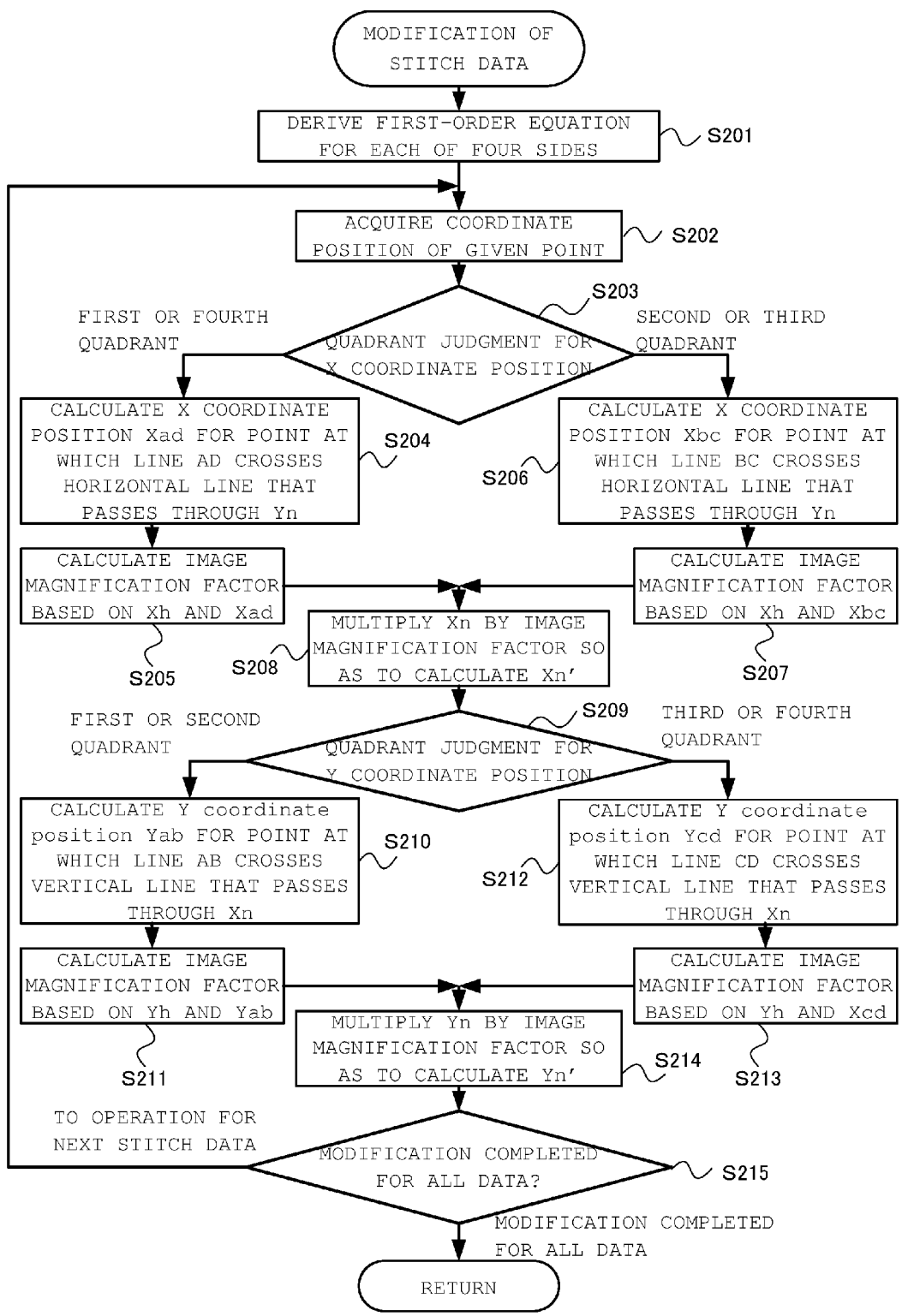
FIG. 4 is a diagram showing an operation for modifying stitch data according to the embodiment of the present invention.
Figure 18:
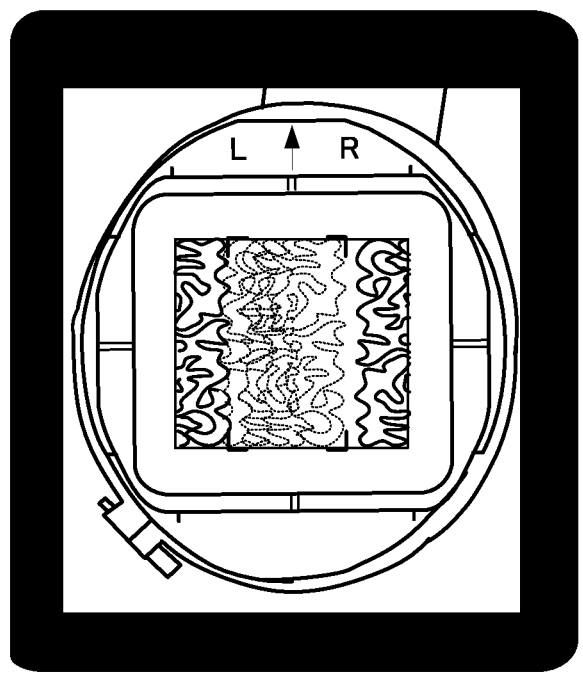
FIG. 18 is a diagram showing an example state according to the embodiment of the present invention in which cursor marks are displayed at the four corners of the stitch image after the position of the stitch image of the stippling design to be connected is determined.
Figure 19:
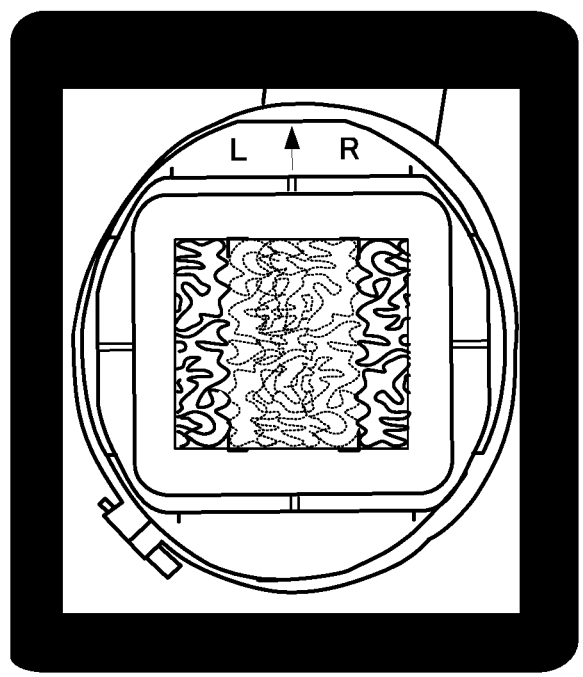
FIG. 19 is a diagram showing an example state according to the embodiment of the present invention in which the cursor marks displayed at the four corners of the stitch image are dragged in order to adjust the size or shape of the stitch image.
Figure 20:
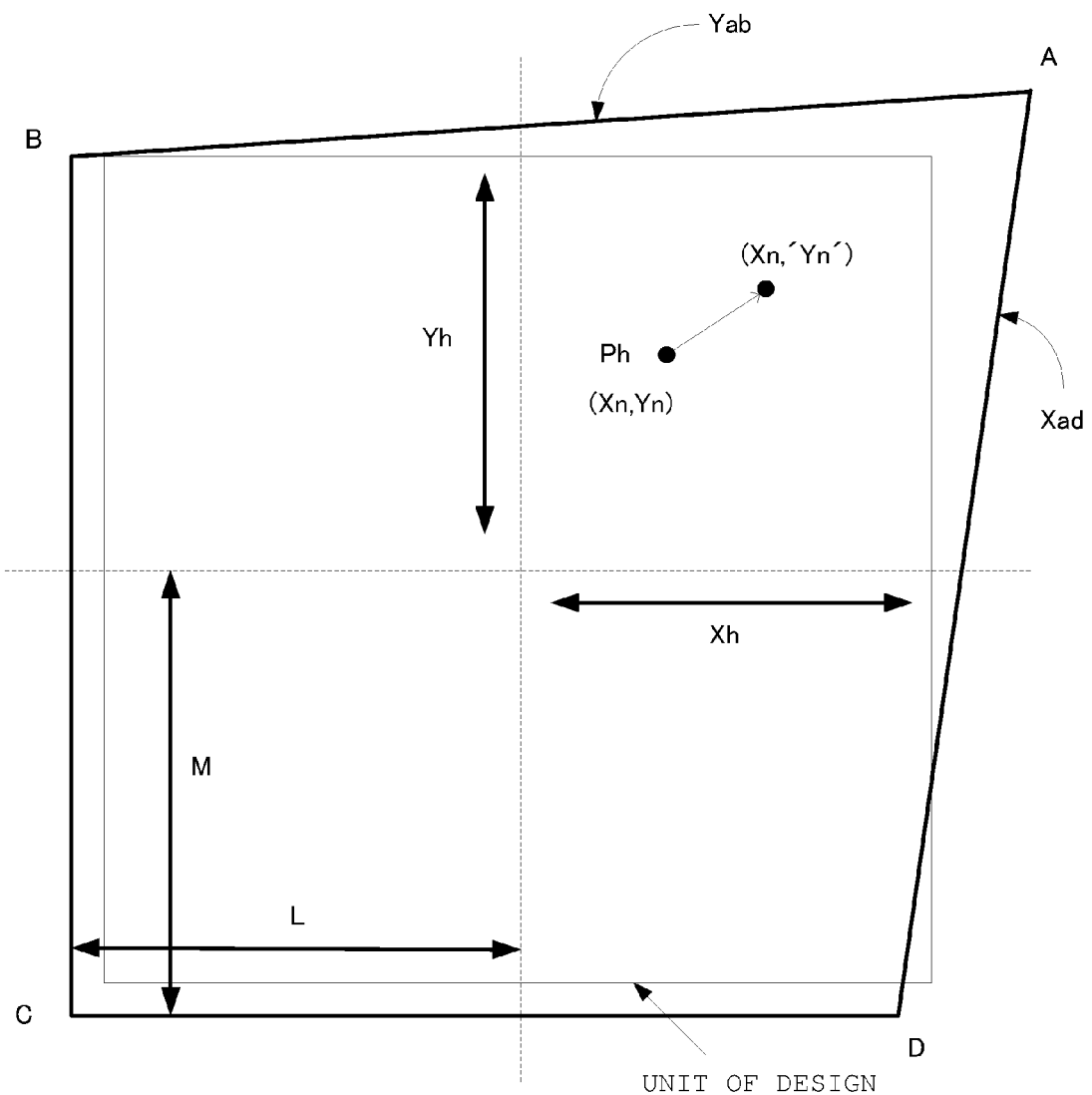
FIG. 20 is a diagram for explaining the modification of the stitch data according to the embodiment of the present invention.

When the user taps the area of the stitch image, as shown in FIG. 18, cursor marks are displayed at the four corners of the image. As shown in FIG. 19, the user drags the cursors to the desired corners of the stippling image so as to adjust the stitch image such that they are connected to each other (Step S114). Such a dragging operation may be performed by the user using a finger or otherwise a stylus, which is readily conceivable. Also, in a case in which such an arrangement is capable of performing image recognition so as to detect an embroidery region of a cloth having an embroidery design beforehand, the stitch image may be automatically dragged such that it is connected with the embroidery region thus detected. It should be noted that description has been made in the present embodiment regarding an example in which such cursor marks are displayed at the four corners. Also, such cursor marks may be displayed between the adjacent corners of the four corners, for example. FIG. 20 shows an extreme example. In this example, the four corners A, B, C, and D are dragged such that they match the stippling image, thereby defining a new rectangle ABCD. The coordinate positions of the vertexes of the rectangle ABCD are supplied to Step S108. In Step S108, the stitch data is modified such that it defines a given stippling embroidery design (Step S115). It should be noted that the modification method is described in a subroutine as shown in FIG. 4. The embroidery design image editing unit edits the stitch data using the modification method. The embroidery design data editing unit 26 edits and modifies, based on the stitch image thus edited, the embroidery design data generated by the embroidery design data generating unit 19. The embroidery design data thus edited and modified is used as the embroidery design data to be used in embroidery.

The embroidery design data thus edited and modified is transmitted to the sewing machine 40 (Step S116), and the embroidery frame is mounted on the sewing machine 40 in the same state as it was when image acquisition was performed. In this state, the sewing machine 40 performs a sewing operation, thereby providing a stippling design without a sewing gap. Furthermore, such operations represented by Steps S104 through S116 are repeatedly executed for the remaining spaces between the embroidery designs (Step S117). The data to be transmitted to the sewing machine 40 is not restricted to the aforementioned embroidery design data thus edited and modified. Also, the image data of the embroidery design edited by the embroidery design image editing unit 20 may be transmitted to the sewing machine 40. In this case, after the sewing machine 40 receives the image data, the sewing machine 40 itself edits and modifies the embroidery design data recorded in the sewing machine 40, based on the image data thus received. The sewing machine 40 performs a sewing operation according to the sewing design data thus edited.

Modification Operation for Stitch Data

Description will be made with reference to FIGS. 3, 4, and 20 regarding a modification operation for the stitch data according to the present embodiment.

As shown in FIG. 20, the stitch data is defined with the coordinate position of the center of the design as (0, 0). Coordinate values in the right region and in the upper region have positive values, and coordinate values in the left region and in the lower region have negative values. With the stitch data thus defined, a coordinate position (X, Y) is defined for each needle location point.

First, a first-order equation is derived for each side of the rectangle ABCD based on the coordinate positions of the vertexes of the rectangle ABCD thus obtained in Step S114 shown in FIG. 4 (Step S201). In the case shown in FIG. 20, the slope can be defined for the lines AD and AB. Accordingly, the lines AD and AB can each be represented by the expression $y=a \cdot x+b$. Here, "a" represents the slope, and "b" represents the intercept. On the other hand, the lines BC and CD have an undefined slope and a zero slope, respectively, so they are represented by $x=-L$ and $y=-M$, respectively.

The coordinate position of a given needle location point Pn is acquired (Step S202). Next, judgment is made whether the X coordinate position of the needle location point Pn belongs to the first or fourth quadrant or belongs to the second or third quadrant (Step S203). When judgment has been made that the X coordinate position belongs to the first or fourth quadrant (Step S203), the X coordinate position Xad is calculated for a point at which the line AD crosses a horizontal line that passes through the Y coordinate position Yn of the needle location point (Step S204). The image magnification factor is calculated based on the ratio between Xad and half the width of the embroidery design data, i.e., Xh (Step S205). Next, the X coordinate position Xn of the needle location point Pn is multiplied by the image magnification factor thus calculated so as to calculate a modified X coordinate position Xn' (Step S208).

On the other hand, when judgment has been made that the X coordinate position belongs to the second or third quadrant (Step S203), the slope is undefined. In this case, the linear equation to be used is represented by X=−L, and accordingly, the X coordinate position is set to a constant value regardless of the Y coordinate position (Step S206). Thus, the image magnification factor is calculated based on the ratio between Xh and L (Step S207).

Next, judgment is made whether the Y coordinate position of the needle location point Pn belongs to the first or second quadrant or belongs to the third or fourth quadrant (Step S209). When judgment has been made that the Y coordinate position belongs to the first or second quadrant (Step S209), the Y coordinate position Yab is calculated for a point at which the line AB crosses a vertical line that passes through the X coordinate position Xn of the needle location point (Step S210). The image magnification factor is calculated based on the ratio between Yab and half the height of the embroidery design data, i.e., Yh (Step S211). Next, the Y coordinate position Yn of the needle location point Pn is multiplied by the image magnification factor thus calculated so as to calculate a modified Y coordinate position Yn' (Step S214).

On the other hand, when judgment has been made that the Y coordinate position belongs to the third or fourth quadrant (Step S209), the slope is zero. In this case, the linear equation to be used is represented by Y=−M, and accordingly, the Y coordinate position is set to a constant value regardless of the X coordinate position (Step S212). Thus, the image magnification factor is calculated based on the ratio between Yh and M (Step S213).

Next, the coordinate position (Xn, Yn) of the needle location point Pn is modified based on the rectangle ABCD into the coordinate position (Xn', Yn'), which is employed as a new needle location point. Such operations represented by Steps S201 through S214 are performed for all the stitch data, thereby modifying the stitch data for the embroidery design such that it is accommodated within the rectangle ABCD (Step S215).

Effects of the Present Embodiment

As described above, with the present embodiment, in a case in which multiple stippling embroidery designs are connected so as to form a single large stippling design, in the first step, the stippling designs are intentionally sewn discontinuously, instead of sewing the multiple embroidery designs continuously. In the second step, a rectangular embroidery design to be provided in the subsequent sewing is modified such that it matches a space between the adjacent embroidery designs that varies due to shrinkage that occurs in the sewing operation, alignment error that occurs when the cloth is mounted on the embroidery frame, or the like. Thus, such an arrangement has an advantage of providing embroidery such that the stippling design fits such a space between the adjacent embroidery designs.

After a cloth to which discontinuous stippling designs have been sewn is stretched over an embroidery frame having a known size, an image of the cloth is acquired together with the external appearance of the embroidery frame. Thus, such an arrangement is capable of acquiring image magnification factor information. Furthermore, the sewing image for the stippling designs is displayed on the acquired video image in a superimposed manner with the image magnification factor thus acquired. Thus, such an arrangement allows the user to visually check the level of deviation of the sewing image and to check for overlapping or gaps. Moreover, by dragging the cursors displayed at the four corners of the sewing image to optimum positions such that they match the space displayed on the screen, such an arrangement allows the user to modify the embroidery data such that it fits a space defined by the four corners.

It should be noted that description has been made above regarding an example in which the multiple stippling embroidery designs are arranged discontinuously. However, in some cases, a gap occurs between the adjacent embroidery designs due to accumulated shrinkage or the like that occurs in the sewing operation even after the multiple embroidery designs are arranged continuously. In this case, such a gap is preferably filled with an embroidery design in the final adjustment. The technique disclosed in the present embodiment is applicable to such an arrangement. Specifically, the rectangular stippling embroidery design is adjusted such that it is accommodated within a remaining space, thereby appropriately arranging such a stippling design in a desired area of the cloth to be subjected to embroidery.

Also, the present embodiment is applicable to connecting multiple separate designs in addition to the stippling design sewing. With conventional techniques, a connecting design is shifted in parallel or is rotated so as to connect adjacent designs. However, in some cases, it is difficult for such simple editing functions to connect the adjacent designs. With the technique according to the present embodiment, such an arrangement further provides a function of modifying the shape of the design according to the outline of an adjacent design, thereby providing an advantage of allowing the adjacent designs to be connected in a simple manner without a gap between them.

It should be noted that the operation of the sewing system or the embroidery design connecting data generating apparatus may be recorded on a computer-system-readable or computer-readable recording medium in the form of a program. Also, such a program thus recorded on the recording medium may be read out and executed by the sewing system or the embroidery design connecting data generating apparatus, thereby providing the sewing system or the embroidery design connecting data generating apparatus according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention.

REFERENCE SIGNS LIST 10 tablet terminal (embroidery design connecting data generating apparatus)
11 embroidery frame information acquisition unit
12 input operating unit
13 sewing execution number-of-times determination unit
14 display unit
15 operation instructing unit
16 image acquisition unit
17 acquired image analyzing unit
18 embroidery region determination unit
19 embroidery design data generating unit
20 embroidery design image editing unit
21 transmission unit
22 gravity direction detection unit
23 correction unit
24 control unit
25 operation guidance unit
26 embroidery design data editing unit
27 display control unit
40 sewing machine
41 sewing-machine-side display unit
42 reception unit
43 sewing-machine-side storage unit
44 control unit
45 embroidery frame identifying unit
46 embroidery operation executing unit
60 embroidery target cloth
70 wireless LAN
80 USB memory
110 embroidery frame
111 inner frame
112 outer frame
113 center axis
114 embroidery region mark

What is claimed is:

1. An embroidery design connecting data generating apparatus comprising:
an embroidery frame information acquisition unit that acquires information with respect to an embroidery frame and information with respect to a mark alignment region displayed on a display unit for guiding a plurality of marks arranged at preset positions within the embroidery frame for defining an embroidery region of the embroidery frame;
an image acquisition unit that acquires an image of the embroidery frame and an embroidery design sewn to a portion of a cloth mounted on the embroidery frame when the plurality of marks are all aligned with the mark alignment region in an image displayed on the display unit;
an acquired image analyzing unit that performs image analysis for the plurality of marks in the image acquired by the image acquisition unit based on a correspondence with the information with respect to the embroidery frame acquired by the embroidery frame information acquisition unit;
an embroidery region determination unit that determines the embroidery region of the embroidery frame based on an analysis result obtained by the acquired image analyzing unit; and
an embroidery design image editing unit that edits an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined.

2. The embroidery design connecting data generating apparatus according to claim 1, comprising an embroidery design data generating unit that generates data of the embroidery design based on the information with respect to the embroidery frame.

3. The embroidery design connecting data generating apparatus according to claim 1, wherein the embroidery design to be sewn to the cloth is the same as the embroidery design that has been sewn to the portion of the cloth.

4. The embroidery design connecting data generating apparatus according to claim 2, comprising an embroidery design data editing unit that edits the data of the embroidery design generated by the embroidery design data generating unit, based on the image of the embroidery design edited by the embroidery design image editing unit before it is sewn to the cloth.

5. The embroidery design connecting data generating apparatus according to claim 1, comprising an input operating unit that allows a user to input an operating instruction,
wherein the embroidery design image editing unit edits the image of the embroidery design to be sewn to the cloth, according to an operating instruction received via the input operating unit.

6. The embroidery design connecting data generating apparatus according to claim 5, comprising a sewing execution number-of-times determination unit that determines a number of times that sewing of the embroidery design is to be performed for the cloth, based on the information with respect to the embroidery frame acquired by the embroidery frame information acquisition unit and information received via the input operating unit with respect to a region of the cloth to be subjected to the embroidery sewing.

7. The embroidery design connecting data generating apparatus according to claim 1, wherein the image acquisition unit performs image acquisition giving priority to a region of the cloth that is not adjacent to other regions thereof each having an embroidery design sewn portion.

8. The embroidery design connecting data generating apparatus according to claim 7, comprising an operation guidance unit that provides a user with at least one from among a guidance display and an audio guidance in the image acquisition operation of the image acquisition unit.

9. The embroidery design connecting data generating apparatus according to claim 1, wherein the embroidery design image editing unit modifies the image of the embroidery design by shifting at least one from among a vertex or otherwise a side of the outer shape of the embroidery design in an image having a polygonal shape.

10. The embroidery design connecting data generating apparatus according to claim 1, comprising a gravity direction detection unit that detects a gravity direction,
wherein the display unit further displays an image acquisition orientation guidance display for guiding an alignment between an image acquisition optical axis of the image acquisition unit and the gravity direction based on a detection result obtained by the gravity direction detection unit.

11. The embroidery design connecting data generating apparatus according to claim 10, wherein, when the marks are aligned within the mark alignment region and when judgment has been made based on the detection result obtained by the gravity direction detection unit that the image acquisition optical axis aligns with the gravity direction, the image acquisition unit automatically performs image acquisition.

12. The embroidery design connecting data generating apparatus according to claim 11, comprising a correction unit configured such that, when there is an inclination between the display unit and the embroidery region thus determined in the image acquired by the image acquisition unit, the inclination is corrected.

13. An embroidery design connecting data generating method employed in an embroidery design connecting data generating apparatus, the embroidery design connecting data generating method comprising:
   acquiring, by an embroidery frame information acquisition unit of the embroidery design connecting data generating apparatus, information with respect to an embroidery frame and information with respect to a mark alignment region displayed on a display unit for guiding a plurality of marks arranged at preset positions within the embroidery frame for defining an embroidery region of the embroidery frame;
   acquiring, by an image acquisition unit of the embroidery design connecting data generating apparatus, an image of the embroidery frame and an embroidery design sewn to a portion of a cloth mounted on the embroidery frame when the plurality of marks are all aligned with the mark alignment region in an image displayed on the display unit;
   performing image analysis, by an acquired image analyzing unit of the embroidery design connecting data generating apparatus, for the plurality of marks in the image acquired by the image acquisition unit based on a correspondence with the information with respect to the embroidery frame acquired by the embroidery frame information acquisition unit;
   determining, by an embroidery region determination unit of the embroidery design connecting data generating apparatus, the embroidery region of the embroidery frame based on an analysis result obtained by the acquired image analyzing unit; and
   editing, by an embroidery design image editing unit of the embroidery design connecting data generating apparatus, an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined.

14. A sewing system comprising an embroidery design connecting data generating apparatus and a sewing machine, wherein the embroidery design connecting data generating apparatus comprises:
   an embroidery frame information acquisition unit that acquires information with respect to an embroidery frame and information with respect to a mark alignment region displayed on a display unit for guiding a plurality of marks arranged at preset positions within the embroidery frame for defining an embroidery region of the embroidery frame;
   an image acquisition unit that acquires an image of the embroidery frame and an embroidery design sewn to a portion of a cloth mounted on the embroidery frame when the plurality of marks are all aligned with the mark alignment region in an image displayed on the display unit;
   an acquired image analyzing unit that performs image analysis for the plurality of marks in the image acquired by the image acquisition unit based on a correspondence with the information with respect to the embroidery frame acquired by the embroidery frame information acquisition unit;
   an embroidery region determination unit that determines the embroidery region of the embroidery frame based on an analysis result obtained by the acquired image analyzing unit;
   an embroidery design image editing unit that edits an image of an embroidery design to be sewn to the cloth such that it is connected to the image of the embroidery design that has already been sewn to the portion of the cloth in a state in which the display unit displays the image acquired by the image acquisition unit for the embroidery design that has already been sewn to the portion of the cloth, the image of the embroidery design to be sewn to the cloth, and an image of the embroidery region thus determined; and
   a transmission unit that transmits, to the sewing machine, image data of the embroidery design edited by the embroidery design image editing unit or otherwise embroidery design data edited based on the image of the embroidery design edited by the embroidery design image editing unit,
   and wherein the sewing machine comprises:
      a reception unit that receives image data of the embroidery design or otherwise the embroidery design data transmitted from the transmission unit; and
      an embroidery operation executing unit that executes an embroidery operation for the cloth mounted on the embroidery frame according to the image data of the embroidery design or otherwise the embroidery design data received via the reception unit.

* * * * *